United States Patent
Cho (10) Patent No.: US 12,486,170 B2
(45) Date of Patent: Dec. 2, 2025

(54) SYNTHESIS METHOD OF SILICON NITRIDE POWDER AND SINTERED BODY

(71) Applicant: ZONE INFINITY CO., LTD., Gyeonggi-do (KR)

(72) Inventor: In Chul Cho, Gyeonggi-do (KR)

(73) Assignee: ZONE INFINITY CO., LTD., Gyeonggi-do (KR)

( * ) Notice: Subject to any disclaimer, the term of this patent is extended or adjusted under 35 U.S.C. 154(b) by 520 days.

(21) Appl. No.: 18/080,016

(22) Filed: Dec. 13, 2022

(65) Prior Publication Data

US 2023/0339755 A1   Oct. 26, 2023

(30) Foreign Application Priority Data

Dec. 28, 2021  (KR) .......................... 10-2021-0189291

(51) Int. Cl.
*C01B 21/068* (2006.01)
*C04B 35/593* (2006.01)

(52) U.S. Cl.
CPC ...... *C01B 21/0682* (2013.01); *C01P 2004/03* (2013.01); *C01P 2004/61* (2013.01); *C04B 35/593* (2013.01)

(58) Field of Classification Search
CPC ............. C01B 21/0682; C01P 2004/03; C01P 2004/61; B28B 3/006; C04B 35/5935; C04B 35/62605; C04B 2235/3225; C04B 2235/3244; C04B 2235/3865; C04B 2235/658
See application file for complete search history.

(56) References Cited

U.S. PATENT DOCUMENTS

| | | | | |
|---|---|---|---|---|
| 5,114,693 A | * | 5/1992 | Hintermayer | C01B 21/0682 |
| | | | | 423/406 |
| 5,160,719 A | * | 11/1992 | Edler | C04B 35/591 |
| | | | | 423/406 |
| 5,912,200 A | * | 6/1999 | Miyake | C01B 21/068 |
| | | | | 977/777 |

FOREIGN PATENT DOCUMENTS

| CN | 1799995 A | * | 7/2006 | |
|---|---|---|---|---|
| CN | 109399583 A | * | 3/2019 | ......... C01B 21/0682 |
| CN | 111253162 B | * | 4/2022 | ............. C04B 35/64 |
| CN | 115432674 A | * | 12/2022 | ........... C01B 21/068 |

(Continued)

OTHER PUBLICATIONS

English Translation of CN 1799995 A (Year: 2006).*
(Continued)

*Primary Examiner* — Paul A Wartalowicz
*Assistant Examiner* — Slone Elizabeth Simkins
(74) *Attorney, Agent, or Firm* — IPLA P.A.

(57) ABSTRACT

A synthesis method of silicon nitride powder including preparing mixed powder having a particle size of 8 to 10 μm which includes 69 to 98 wt % of silicon powder, 1 to 30 wt % of α-phase silicon nitride powder, and 1 to 10 wt % of silicon dioxide powder; performing heat treatment on the mixed powder in a nitrogen gas atmosphere of 0.85 to 1 atm at a temperature of 1,450 to 1,750° C. for 5 to 20 hours; and cooling the mixed powder gradually to obtain silicon nitride powder; and performing pressure sintering on a silicon nitride sintered body by filling the mixed powder into a mold and then keeping the mixed powder at a temperature of 1,750 to 1,850° C. for 2 to 6 hours while pressure of 150 to 300 kg/cm² is applied thereto in a nitrogen gas atmosphere of 0.85 to 1 atm.

12 Claims, 8 Drawing Sheets

(56) References Cited

FOREIGN PATENT DOCUMENTS

| | | |
|---|---|---|
| JP | 11-310464 | 11/1999 |
| JP | 2000034172 | 2/2000 |

OTHER PUBLICATIONS

English Translation of CN 109399583 A (Year: 2019).*
English Translation of CN 115432674 A (Year: 2022).*
English Translation of CN 111253162 B (Year: 2022).*

* cited by examiner

SYNTHESIS METHOD OF SILICON NITRIDE POWDER AND SINTERED BODY

BACKGROUND

The present invention relates to a synthesis method of silicon nitride powder, and more specifically, to a synthesis method of a silicon nitride powder that is synthesized to be fine particles, have a uniform particle size with an aspect ratio close to 1, and satisfy both an amount of surface oxygen and an amount of internal oxygen which are suitable for sintering and a silicon nitride sintered body synthesized using the synthesized silicon nitride powder to have high thermal conductivity and mechanical strength at a high temperature.

Recently, power semiconductor modules (IGBT, power MOSFETS, etc.) capable of high-voltage and high-current operation are required in fields such as electric power and vehicle inverters.

As a substrate used in the power semiconductor module, a circuit board made of a composite material in which a metal circuit board is bonded to one surface of an insulating ceramic substrate and a metal heat sink is bonded to the other surface thereof is mainly used.

However, high currents flow in such a power semiconductor module, which causes a heating problem. That is, since the insulating ceramic substrate has a relatively low thermal conductivity in comparison with the copper plate, it may be a factor that hinders the heat dissipation process due to a heat transfer from the semiconductor device.

In addition, since the ceramic substrate and the metal plate have different coefficients of thermal expansion, a thermal stress is generated, which may cause cracks in the ceramic substrate. In serious cases, the metal circuit board or the metal heat sink may peel off from the insulating ceramic substrate.

Accordingly, the insulating ceramic substrate used in the power semiconductor module requires high thermal conductivity to improve heat generation. Also, it requires high mechanical strength to prevent cracks and delamination due to the thermal stress.

In this regard, Japanese Patent Laid-Open Publication No. 2000-034172 increases the thermal conductivity of a silicon nitride substrate by crystallizing 20% or more of the grain boundary phase to reduce the ratio of the glass phase with low thermal conductivity. In addition, Japanese Patent Registration No. 3561145 discloses an example of a silicon nitride sintered substrate, which is a silicon nitride heat dissipation substrate of high thermal conductivity by containing crystallinity composed of $MgSiO_3$ or $MgSiN_2$ on the grain boundary.

However, in the case of the sintered substrate, if the $MgSiN_2$ crystal phase is small, the effect of increasing the thermal conductivity of the silicon nitride substrate is reduced. In addition, if the $MgSiN_2$ crystal phase is large, since the effect of bonding between silicon nitride particles as a grain boundary phase is reduced, there is a problem in that the bending strength is reduced.

On the other hand, in the sintering process to increase the thermal conductivity, it is known as a method for producing a silicon nitride substrate in that a molded green sheet or a plurality of sheets are overlapped with BN powder added as a release agent, the inside of the sintering furnace is set in a nitrogen pressurized atmosphere of 0.5 to 1.0 Mpa, the temperature is increased from 1600° C. at a speed of less than 300° C. per hour, it maintains for 2 to 10 hours at a temperature of 1800 to 2000° C., and then the temperature is cooled to 1500° C. at a speed of 100° C. per hour or more to perform the sintering. At this time, it is possible to adjust the physical properties of the silicon nitride substrate by adjusting the sintering process such as a sintering temperature, a gas atmosphere pressure, and a temperature increase rate and so on.

However, the above methods relate to sintering methods and no research has been conducted on methods for improving the thermal conductivity and the mechanical properties by improving the physical properties of silicon nitride powder itself.

Conventional direct nitriding methods can reduce the amount of surface oxygen of silicon nitride powder to a range suitable for sintering. However, it is impossible to simultaneously reduce the amount of internal oxygen while reducing the amount of surface oxygen to a range suitable for sintering.

In the direct nitriding method, the metal silicon as a raw material tends to remain inside the silicon nitride particles of constituting the silicon nitride powder, and due to this, pores or coarse particles are often generated inside the silicon nitride sintered body.

PATENT LITERATURE

Patent Literature 1: Japanese Patent Laid-Open Publication No. 2000-034172
Patent Literature 2: Japanese Patent Registration No. 3561145

SUMMARY OF THE INVENTION

The invention is made to solve the problems described above, and an object of the invention is to provide a synthesis method of a silicon nitride powder that is synthesized to be fine particles, have a uniform particle size with an aspect ratio close to 1, and satisfy both an amount of surface oxygen and an amount of internal oxygen which are suitable for sintering and a silicon nitride sintered body synthesized using the synthesized silicon nitride powder to have high thermal conductivity and mechanical strength at a high temperature.

According to one aspect of the present invention so as to accomplish these objects, there is provided to a synthesis method of silicon nitride powder, including: preparing mixed powder having a particle size of 8 to 10 µm which includes 69 to 98 wt % of silicon powder, 1 to 30 wt % of α-phase silicon nitride powder, and 1 to 10 wt % of silicon dioxide powder; performing heat treatment on the mixed powder in a nitrogen gas atmosphere of 0.85 to 1 atm at a temperature of 1,450 to 1,750° C. for 5 to 20 hours; and cooling the mixed powder gradually to obtain silicon nitride powder, wherein, before the performing of heat treatment, first mixed gas obtained by mixing nitrogen gas and hydrogen gas is fed at a temperature of 600° C., and second mixed gas obtained by mixing moisture, nitrogen gas, hydrogen gas, and hydrogen fluoride gas is fed at a temperature of 1,000° C., and wherein, after the performing of heat treatment, feeding of the first mixed gas and the second mixed gas is stopped.

At this time, the silicon nitride powder includes 90 wt % or more of α-phase silicon nitride powder with respect to total weight.

In addition, the first mixed gas includes 50 to 90 vol % of nitrogen gas and 10 to 50 vol % of hydrogen gas, and the second mixed gas includes 50 to 90 vol % of nitrogen gas and 10 to 50 vol % of hydrogen gas, in which an amount of moisture is contained by 0.5 to 0.6% with respect to a supply amount of the second mixed gas and a supply amount of hydrogen fluoride gas is 0.001 to 0.5% with respect to a supply amount of the nitrogen gas.

According to another aspect of the present invention so as to accomplish these objects, there is provided to a synthesis method of silicon nitride powder, including: preparing mixed powder having a particle size of 8 to 10 μm which includes 69 to 98 wt % of silicon powder, 1 to 30 wt % of α-phase silicon nitride powder, and 1 to 10 wt % of silicon dioxide powder; performing heat treatment on the mixed powder in a nitrogen gas atmosphere of 0.85 to 1 atm at a temperature of 1,800 to 1, 900° C. for 5 to 20 hours; and cooling the heat-treated mixed powder at −100° C./hr to obtain silicon nitride powder, wherein, before the performing of heat treatment, first mixed gas obtained by mixing nitrogen gas and hydrogen gas is fed at a temperature of 600° C., and second mixed gas obtained by mixing moisture, nitrogen gas, hydrogen gas, and hydrogen fluoride gas is fed at a temperature of 1,000° C., and wherein, after the performing of heat treatment, feeding of the first mixed gas and the second mixed gas is stopped.

At this time, the silicon nitride powder includes 90 wt % or more of β-phase silicon nitride powder.

In addition, the first mixed gas includes 50 to 90 vol % of nitrogen gas and 10 to 50 vol % of hydrogen gas, and the second mixed gas includes 50 to 90 vol % of nitrogen gas and 10 to 50 vol % of hydrogen gas, in which an amount of moisture is contained by 0.5 to 0.6% with respect to a supply amount of the second mixed gas and a supply amount of hydrogen fluoride gas is 0.001 to 0.5% with respect to a supply amount of the nitrogen gas.

According to further another aspect of the present invention so as to accomplish these objects, there is provided to a synthesis method of a silicon nitride sintered body including: preparing mixed powder obtained by adding a sintering aid that includes 1 to 5 wt % of yttrium oxide, 0.5 to 1 wt % of aluminum nitride, and 0.5 to 1 wt % of hafnium oxide to 93 to 98 wt % of silicon nitride powder; and performing pressure sintering on a silicon nitride sintered body by filling the mixed powder into a mold and then keeping the mixed powder at a temperature of 1,750 to 1,850° C. for 2 to 6 hours while pressure of 150 to 300 kg/cm$^2$ is applied thereto in a nitrogen gas atmosphere of 0.85 to 1 atm.

According to further another aspect of the present invention so as to accomplish these objects, there is provided to a synthesis method of a silicon nitride sintered body including: preparing mixed powder obtained by adding 2 to 9 mol % of a sintering aid that includes at least two oxides of ytterbium oxide, yttrium oxide, and magnesium oxide to 91 to 98 mol % of silicon nitride powder; performing cold isostatic pressing to manufacture a molded article at pressure of 3 ton after the mixed powder is fed into a mold; and performing gas pressure sintering the molded article in a nitrogen gas atmosphere of 5 to 15 atm at a temperature of 1,800 to 1,950° C. for 12 to 48 hours and synthesizing a silicon nitride sintered body.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment according to the present disclosure are described in detail with reference to the accompanying drawings. It should be noted that the same components in the drawings are denoted by the same reference numerals as much as possible. In addition, the detailed description about the prior related technology will be also omitted when it is judged to blur the gist of this invention in explaining this invention.

Figure 1:
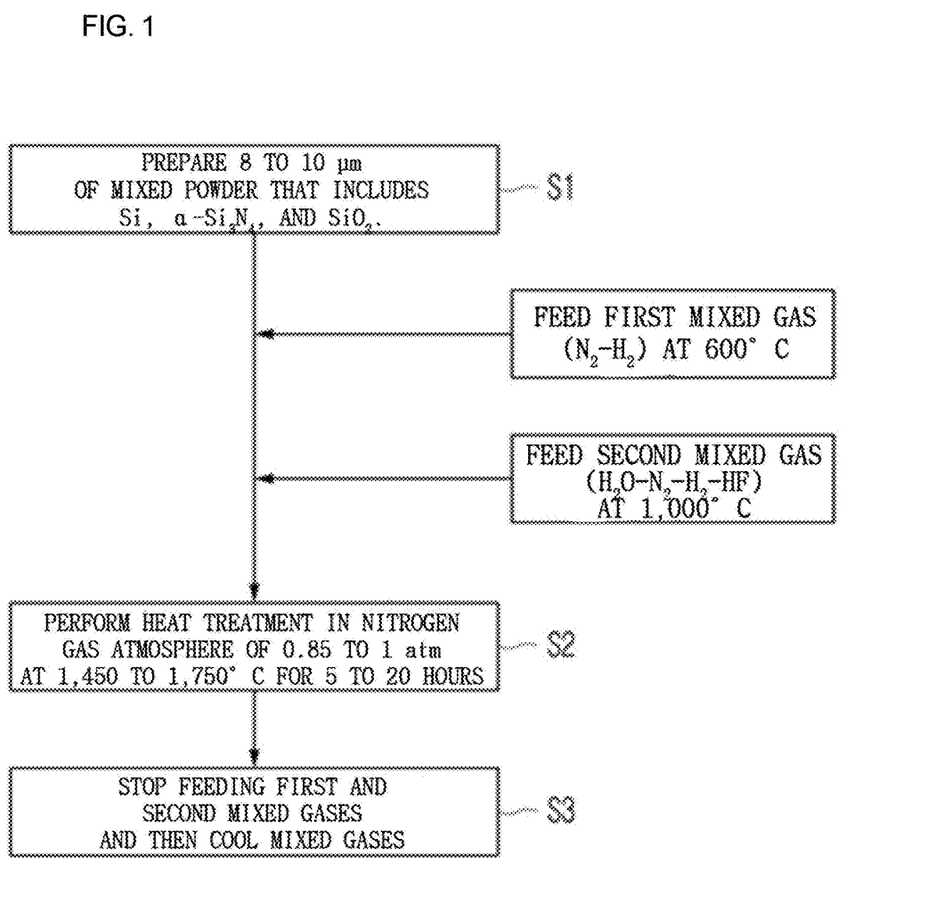
FIG. 1 is a flowchart illustrating a process procedure of a synthesis method of silicon nitride powder according to a first example of the present invention.

FIG. 1 is a flowchart illustrating a process procedure of a synthesis method of silicon nitride powder according to a first example of the invention.

With reference to FIG. 1, the synthesis method of silicon nitride powder according to the first example of the invention includes step S1 of preparing mixed powder, step S2 of performing heat treatment, and step S3 of cooling.

In the step of preparing mixed powder, the mixed powder having a particle size of 8 to 10 μm is prepared by feeding, into a ball mill, a mixed base material obtained by mixing 69 to 98 wt % of silicon powder (Si), 1 to 30 wt % of α-phase silicon nitride powder (α-$Si_3N_4$) as a seed material, and 1 to 10 wt % of silicon dioxide powder ($SiO_2$) as an additive and then performing dry mixing for 48 hours (S1). In the step of performing heat treatment, the mixed powder prepared in the step of preparing mixed powder is put in a synthesis electric furnace made of graphite and is subjected to the heat treatment in a nitrogen gas atmosphere of 0.85 to 1 atm at a temperature of 1,450 to 1, 750° C. for 5 to 20 hours.

In this case, in the invention, in a temperature increasing process before the step of performing heat treatment as described above, first mixed gas ($N_2$—$H_2$) obtained by mixing nitrogen gas and hydrogen gas is fed at a temperature of 600° C., and second mixed gas ($H_2O$—$N_2$—$H_2$—HF) obtained by mixing moisture, nitrogen gas, hydrogen gas, and hydrogen fluoride gas which have been obtained by causing the nitrogen gas, the hydrogen gas, and the hydrogen fluoride gas to pass through a water tank containing water having a temperature of 60 to 80° C. is fed at a temperature of 1,000° C.

Here, the first mixed gas includes 50 to 90 vol % of nitrogen gas and 10 to 50 vol % of hydrogen gas, and the second mixed gas includes 50 to 90 vol % of nitrogen gas and 10 to 50 vol % of hydrogen gas, in which an amount of moisture ($H_2O$) is contained by 0.5 to 0.6% with respect to a supply amount of the second mixed gas and a supply amount of hydrogen fluoride gas is 0.001 to 0.5% with respect to a supply amount of the nitrogen gas.

As described above, after the first mixed gas and the second mixed gas are fed, reactions of Reaction Formula 1, Reaction Formula 2, and Reaction Formula 3 occur in the step of performing heat treatment.

<Reaction Formula 1>

$3Si+2N_2 \rightarrow \alpha\text{-}Si_3N_4(\text{solid})$ $SiO_2+H_2 \rightarrow SiO+H_2O$ <Reaction Formula 2>

$SiO+2N_2 > \alpha\text{-}Si_3N_4(\text{solid})+3/2O_2$

<Reaction Formula 3>

$\alpha\text{-}Si_3N_4(\text{solid})+4H_2O+18HF \rightarrow 3H_2SiF_6+4NH_4OH$

In the invention, α-phase silicon nitride powder (α-$Si_3N_4$ (solid)) generated by Reaction Formula 1 and Reaction Formula 2 is converted into silicic acid ($3H_2SiF_6$) and ammonia water ($4NH_4OH$) by Reaction Formula 3.

In this case, a process of separating the silicic acid ($3H_2SiF_6$) into finer and more uniform particles than the α-phase silicon nitride powder (α-$Si_3N_4$ (solid)) generated by Reaction Formula 1 and Reaction Formula 2 and re-generating α-phase silicon nitride powder (α-$Si_3N_4$ (solid)) by making the silicic acid ($3H_2SiF_6$) that is separated into fine and uniform particles react again with nitrogen is repeated.

Consequently, finally generated α-phase silicon nitride powder (α-$Si_3N_4$ (solid)) is generated as fine and uniform particles suitable for sintering (S2).

In the step of cooling, feeding of the first mixed gas and the second mixed gas is stopped after the step of performing heat treatment is completed, and the heat-treated mixed powder is gradually cooled to obtain silicon nitride powder.

As described above, the obtained silicon nitride powder includes 90 wt % or more of α-phase silicon nitride powder (α-$Si_3N_4$ (solid)) suitable for the sintering with respect to the total weight (S3).

Below, silicon nitride powder is synthesized in accordance with the synthesis method according to the first example of the invention.

EXAMPLE 1

Mixed powder having a particle size of 8 μm was prepared by feeding, into a ball mill, a mixed base material obtained by mixing 98 wt % of silicon powder, 15 wt % of α-phase silicon nitride powder as a seed material, and 5 wt % of silicon dioxide powder as an additive and then performing dry mixing for 48 hours.

The prepared mixed powder was put in a synthesis electric furnace made of graphite and was subjected to the heat treatment in a nitrogen gas atmosphere of 1 atm at a temperature of 1,550° C. for 10 hours.

In this case, in a temperature increasing process before the step of performing heat treatment, first mixed gas ($N_2$—$H_2$) obtained by mixing nitrogen gas and hydrogen gas was fed at a temperature of 600° C., and second mixed gas ($H_2O$—$N_2$—$H_2$—HF) obtained by mixing moisture, nitrogen gas, hydrogen gas, and hydrogen fluoride gas which have been obtained by making the nitrogen gas, the hydrogen gas, and the hydrogen fluoride gas pass through a water tank containing water having a temperature of 60 to 80° C. was fed at a temperature of 1,000° C.

Here, the first mixed gas was set to include 50 vol % of nitrogen gas and 50 vol % of hydrogen gas, and the second mixed gas was set to include 50 vol % of nitrogen gas and 50 vol % of hydrogen gas, in which an amount of moisture ($H_2O$) was contained by 0.5 to 0.6% with respect to a supply amount of the second mixed gas and a supply amount of hydrogen fluoride gas was 0.001 to 0.5% with respect to a supply amount of the nitrogen gas.

After the heat treatment was completed in conditions described above, feeding of the first mixed gas and the second mixed gas was stopped, and the heat-treated mixed powder was gradually cooled to obtain silicon nitride powder.

EXAMPLE 2

Compared to Example 1, Example 2 has the same processes as those of Example 1 except that 10 wt % of silicon dioxide powder is mixed as an additive to the mixed powder, and thus the specific description thereof is to be omitted.

Silicon nitride powder of Examples 1 and 2 synthesized in accordance with the first example of the invention and silicon nitride powder synthesized by direct nitrification in the related art were imaged with an electron microscope.

Figure 2A:
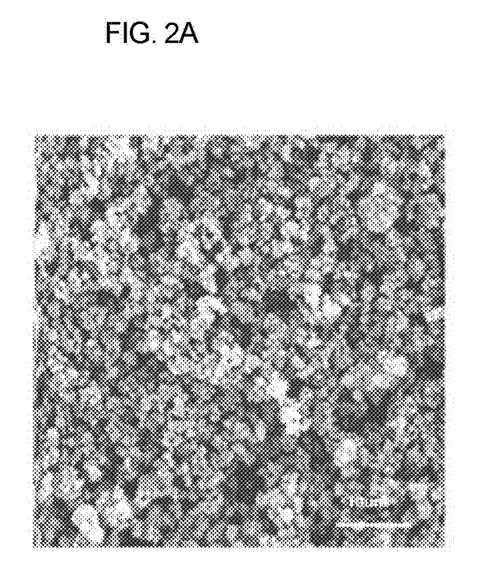
FIG. 2A and FIG. 2B are photographs taken with an electron microscope of a silicon nitride powder prepared according to a first example of the present invention and a silicon nitride powder prepared by the conventional direct nitriding method.
Figure 2B:
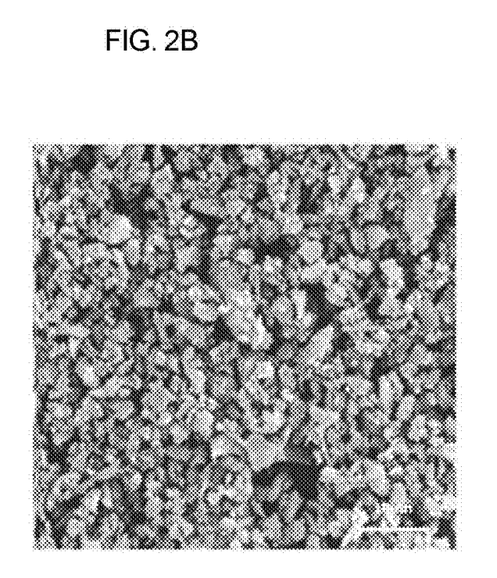

As a result, particles (FIG. 2A) of the silicon nitride powder synthesized in accordance with the first example of the invention were observed to be finer and more uniform than particles (FIG. 2B) of silicon nitride powder synthesized by the direct nitrification in the related art.

In addition, from a result of measuring an amount of oxygen of the silicon nitride powder synthesized in accordance with the first example of the invention, an amount of surface oxygen and an amount of internal oxygen which are suitable for the sintering are observed to be contained as showed in Table 1 below.

TABLE 1

| Analysis items | Total amount of oxygen (w %) | Amount of internal oxygen (w %) | Amount of surface oxygen (w %) |
|---|---|---|---|
| Example 1 | 0.40 | 0.28 | 0.12 |
| Example 2 | 0.42 | 0.32 | 0.14 |

Figure 3A:
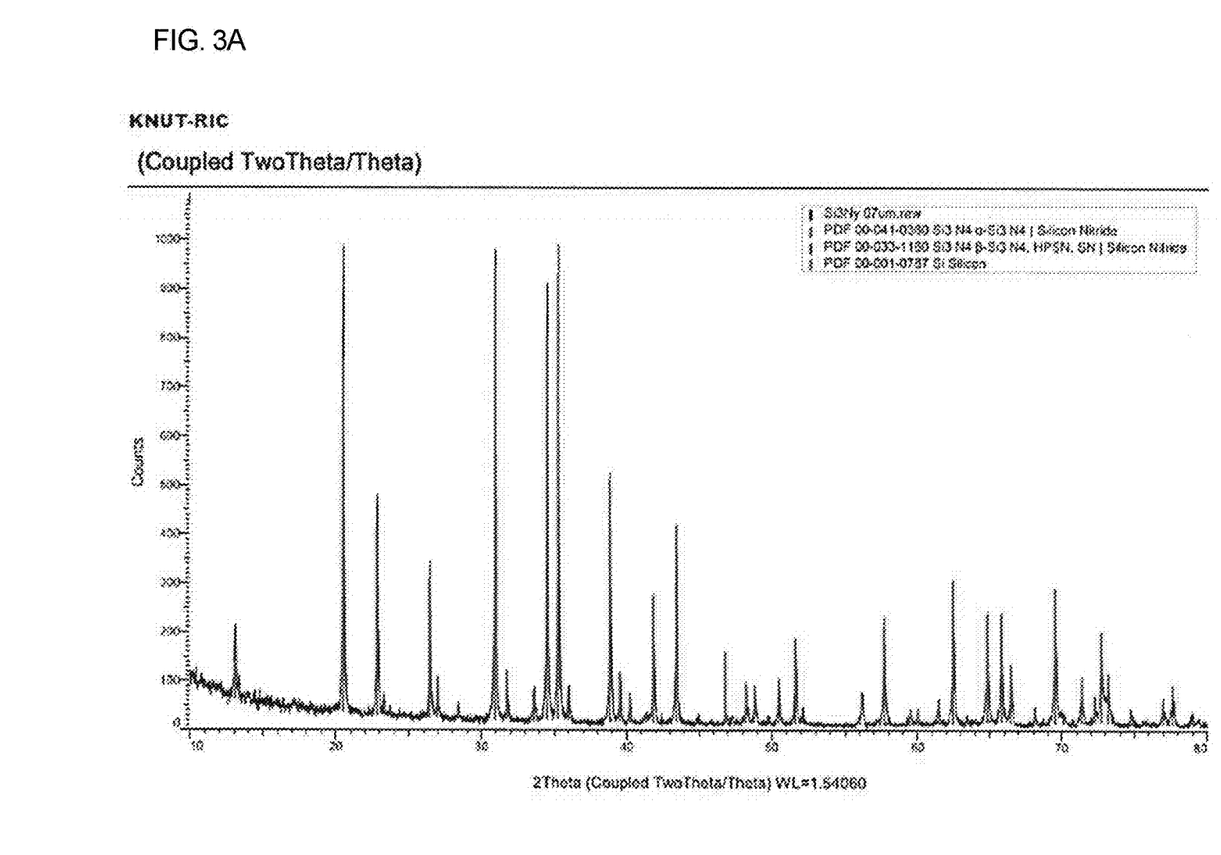
FIG. 3A and FIG. 3B are graphs illustrating the results of XRD (X-Ray Diffracomery) analysis of a silicon nitride powder prepared according to a first example of the present invention.
Figure 3B:
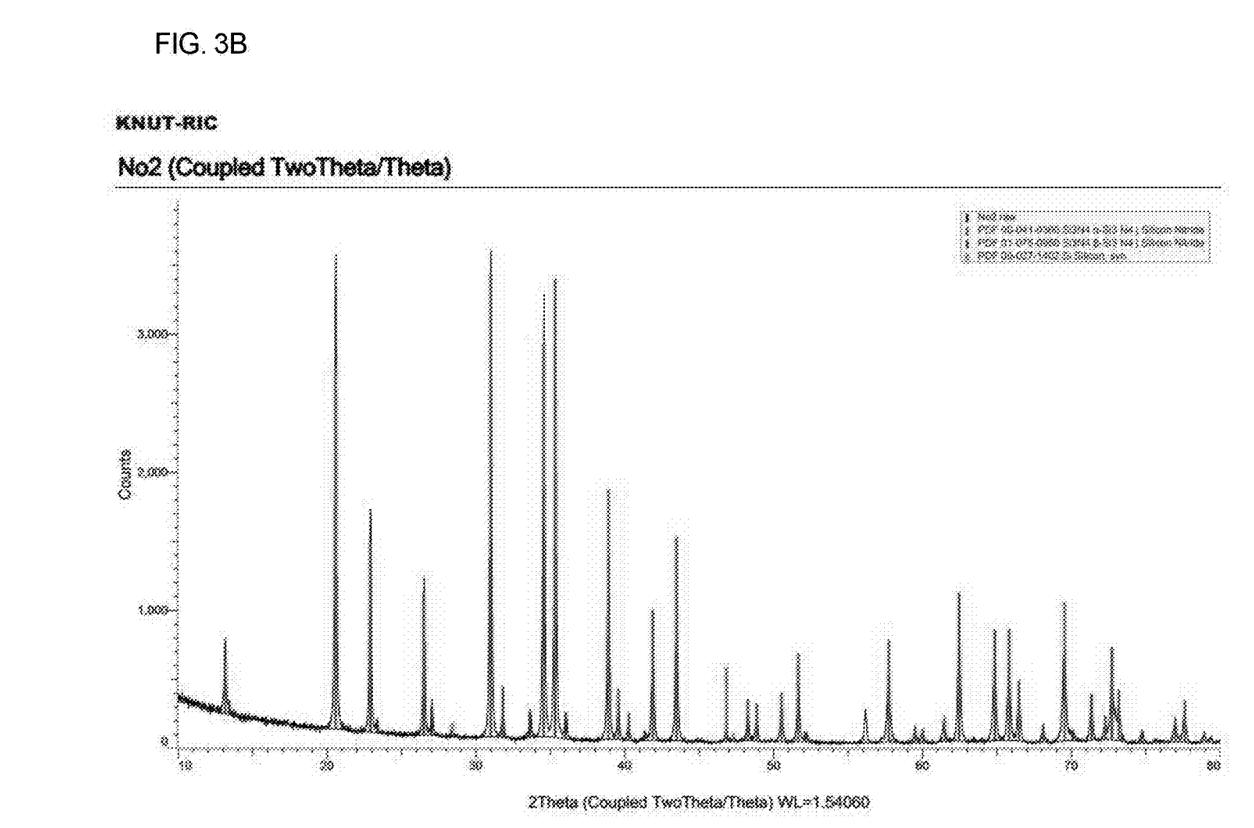

From a result of X-ray diffractometry (XRD) analysis of the silicon nitride powder in Examples 1 and 2 synthesized in accordance with the first example of the invention, α-phase $Si_3N_4$, α-phase $Si_3N_4$, and Si are observed as illustrated in FIGS. 3A and 3B.

On the other hand, from a result of Rietveld quantitative analysis using a Rietveld software (TOPAS) program, as shown in Table 2 below, 90% or more of α-phase Si $N_4$ is observed both in Examples 1 and 2, and a higher α-phase rate of 95% or more is observed particularly in Example 2 in which 10 wt % of $SiO_2$ is added than a α-phase rate of Example 1 in which 5 wt % of $SiO_2$ is added.

TABLE 2

| Analysis items | Phase classification | Content (%) |
|---|---|---|
| Example 1 | $\alpha$-$Si_3N_4$ | 93.94 |
|  | $\beta$-$Si_3N_4$ | 5.51 |
|  | Si | 0.549 |
| Example 2 | $\alpha$-$Si_3N_4$ | 95.29 |
|  | $\beta$-$Si_3N_4$ | 4.23 |
|  | Si | 0.484 |

Figure 4:
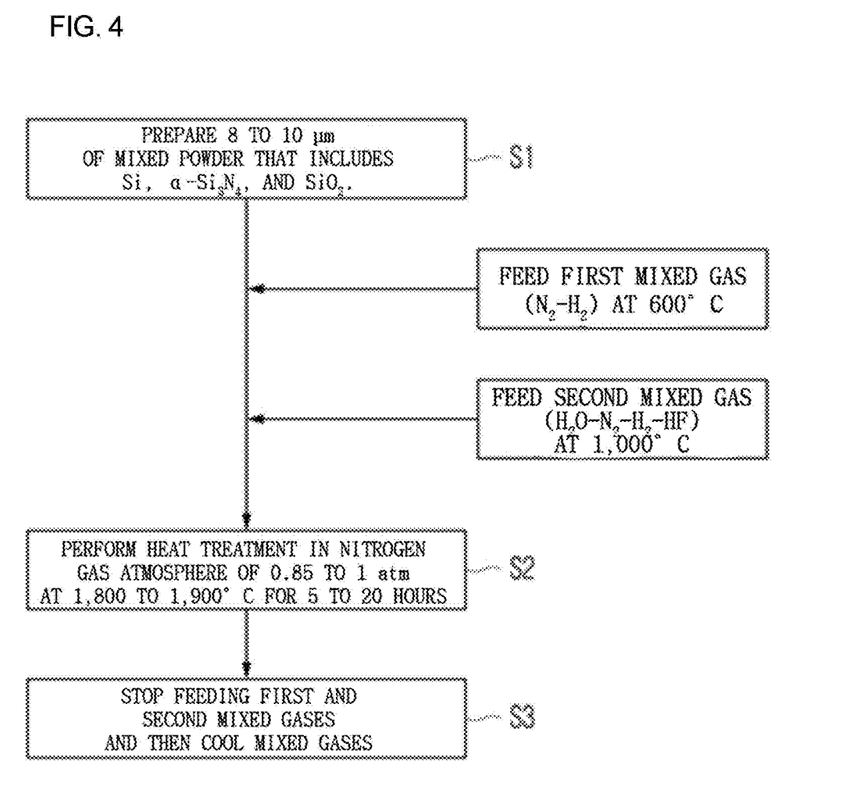
FIG. 4 is a flowchart illustrating a process procedure of a synthesis method of silicon nitride powder according to a second example of the present invention.

FIG. 4 is a flowchart illustrating a process procedure of a synthesis method of silicon nitride powder according to a second example of the invention.

With reference to FIG. 4, the synthesis method of silicon nitride powder according to the second example of the invention includes step S1 of preparing mixed powder, step S2 of performing heat treatment, and step S3 of cooling.

In the step of preparing mixed powder, the mixed powder having a particle size of 8 to 10 μm is prepared by feeding, into a ball mill, a mixed base material obtained by mixing 69 to 98 wt % of silicon powder (Si), 1 to 30 wt % of α-phase silicon nitride powder (α-$Si_3N_4$) as a seed material, and 1 to 10 wt % of silicon dioxide powder ($SiO_2$) as an additive and then performing dry mixing for 48 hours (S1).

In the step of performing heat treatment, the mixed powder prepared in the step of preparing mixed powder is put in a synthesis electric furnace made of graphite and is subjected to the heat treatment in a nitrogen gas atmosphere of 0.85 to 1 atm at a temperature of 1,800 to 1,900° C. for 5 to 20 hours.

In this case, in the invention, in a temperature increasing process before the step of performing heat treatment as described above, first mixed gas ($N_2$—$H_2$) obtained by mixing nitrogen gas and hydrogen gas is fed at a temperature of 600° C., and second mixed gas ($H_2O$—$N_2$—$H_2$—HF) obtained by mixing moisture, nitrogen gas, hydrogen gas, and hydrogen fluoride gas which have been obtained by causing the nitrogen gas, the hydrogen gas, and the hydrogen fluoride gas to pass through a water tank containing water having a temperature of 60 to 80° C. is fed at a temperature of 1,000° C.

Here, the first mixed gas includes 50 to 90 vol % of nitrogen gas and 10 to 50 vol % of hydrogen gas, and the second mixed gas includes 50 to 90 vol % of nitrogen gas and 10 to 50 vol % of hydrogen gas, in which an amount of moisture ($H_2O$) is contained by 0.5 to 0.6% with respect to a supply amount of the second mixed gas and a supply amount of hydrogen fluoride gas is 0.001 to 0.5% with respect to a supply amount of the nitrogen gas.

As described above, after the first mixed gas and the second mixed gas are fed, reactions of Reaction Formula 4, Reaction Formula 5, and Reaction Formula 6 occur in the step of performing heat treatment.

<Reaction Formula 4>

$$3Si+2N_2 \to \beta\text{-}Si_3N_4(\text{solid})$$

$$SiO_2+H_2 \to SiO+H_2O$$

<Reaction Formula 5>

$$SiO+2N_2 \to \beta\text{-}Si_3N_4(\text{solid})+3/2O_2$$

<Reaction Formula 6>

$$\beta\text{-}Si_3N_4(\text{solid})+4H_2O+18HF \to 3H_2SiF_6+4NH_4OH$$

In the invention, β-phase silicon nitride powder (β-$Si_3N_4$ (solid)) generated by Reaction Formula 4 and Reaction Formula 5 is converted into silicic acid ($3H_2SiF_6$) and ammonia water ($4NH_4OH$) by Reaction Formula 6.

In this case, a process of separating the silicic acid ($3H_2SiF_6$) into finer and more uniform particles than the β-phase silicon nitride powder (β-SiN4 (solid)) generated by Reaction Formula 4 and Reaction Formula 5 and re-generating β-phase silicon nitride powder (β-$Si_3N_4$ (solid)) by making the silicic acid ($3H_2SiF_6$) that is separated into fine and uniform particles react again with nitrogen is repeated.

Consequently, finally generated β-phase silicon nitride powder (β-$Si_3N_4$ (solid)) is generated as fine and uniform particles suitable for sintering (S2).

In the step of cooling, feeding of the first mixed gas and the second mixed gas is stopped after the step of performing heat treatment is completed, and the heat-treated mixed powder is gradually cooled at −100° C./hr to obtain silicon nitride powder.

As described above, the obtained silicon nitride powder includes 90 wt % or more of β-phase silicon nitride powder (β-$Si_3NA$ (solid)) suitable for the sintering with respect to the total weight (S3).

Below, silicon nitride powder is synthesized in accordance with the synthesis method according to the second example of the invention.

EXAMPLE 3

Mixed powder having a particle size of 8 μm was prepared by feeding, into a ball mill, a mixed base material obtained by mixing 98 wt % of silicon powder, 15 wt % of α-phase silicon nitride powder as a seed material, and 5 wt % of silicon dioxide powder as an additive and then performing dry mixing for 48 hours.

The prepared mixed powder was put in a synthesis electric furnace made of graphite and was subjected to the heat treatment in a nitrogen gas atmosphere of 1 atm at a temperature of 1,800° C. for 10 hours.

In this case, in a temperature increasing process before the step of performing heat treatment, first mixed gas ($N_2$—$H_2$) obtained by mixing nitrogen gas and hydrogen gas was fed at a temperature of 600° C., and second mixed gas ($H_2O$—$N_2$—$H_2$—HF) obtained by mixing moisture, nitrogen gas, hydrogen gas, and hydrogen fluoride gas which have been obtained by making the nitrogen gas, the hydrogen gas, and the hydrogen fluoride gas pass through a water tank containing water having a temperature of 60 to 80° C. was fed at a temperature of 1,000° C.

Here, the first mixed gas was set to include 50 vol % of nitrogen gas and 50 vol % of hydrogen gas, and the second mixed gas was set to include 50 vol % of nitrogen gas and 50 vol % of hydrogen gas, in which an amount of moisture ($H_2O$) was contained by 0.5 to 0.6% with respect to a supply amount of the second mixed gas and a supply amount of hydrogen fluoride gas was 0.001 to 0.5% with respect to a supply amount of the nitrogen gas.

After the heat treatment was completed in conditions described above, feeding of the first mixed gas and the second mixed gas was stopped, and the heat-treated mixed powder was gradually cooled at −100° C./hr to obtain silicon nitride powder.

As described above, the silicon nitride powder of Example 3 synthesized in accordance with the second example of the invention was imaged with an electron microscope.

Figure 5A:
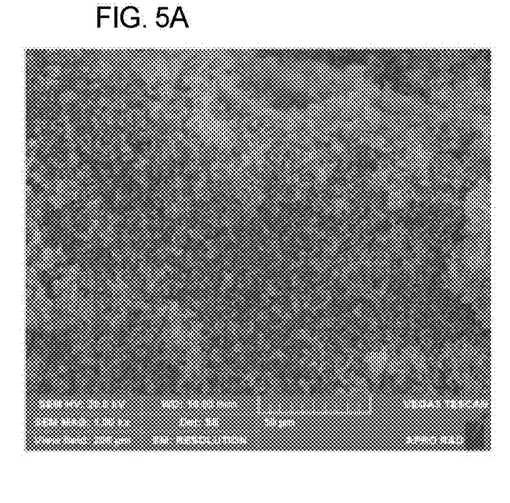
FIG. 5A and FIG. 5B are photographs taken with an electron microscope of a silicon nitride powder prepared according to a second example of the present invention.
Figure 5B:
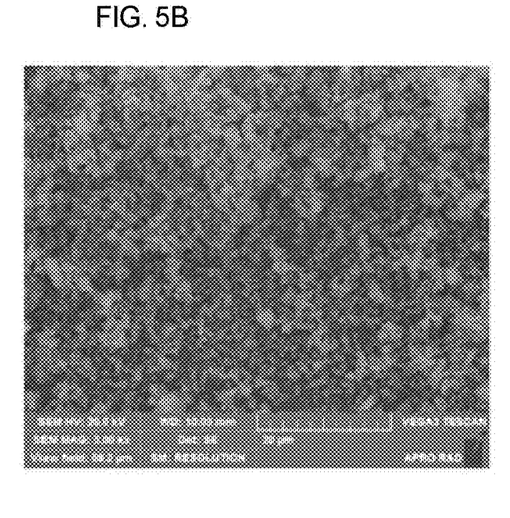

As a result, particles (Example 3) of the silicon nitride powder synthesized in accordance with the second example of the invention were observed to be fine and uniform as illustrated in FIG. 5A imaged with magnification power of 1,000 and FIG. 5B imaged with magnification power of 3,000.

Figure 6:
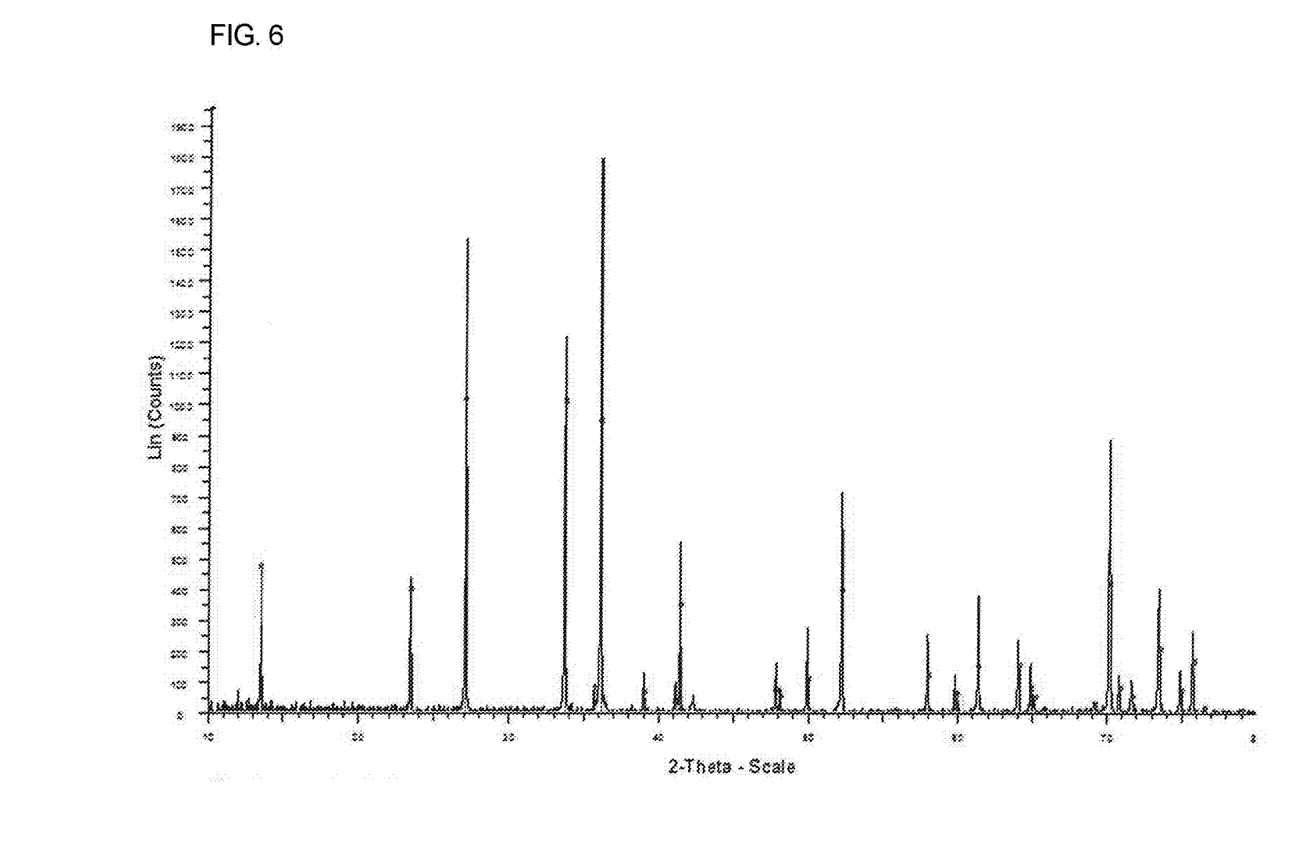
FIG. 6 is a graph illustrating the results of XRD (X-Ray Diffracomery) analysis of the silicon nitride powder prepared according to a second example of the present invention.

In addition, from a result of the X-ray diffractometry (XRD) analysis of the silicon nitride powder synthesized in accordance with the second example of the invention, β-phase $Si_3N_4$, and SiCN are observed as illustrated in FIG. 6.

On the other hand, from a result of Rietveld quantitative analysis using a Rietveld software (TOPAS) program, as shown in Table 3 to be provided below, β-phase $Si_3N_4$ is observed at a high β-phase rate of 97% or more in Example 3

TABLE 3

| Analysis items | Phase classification | Content (%) |
|---|---|---|
| Example 3 | β-$Si_3N_4$ | 97.06 |
| | Si | 2.94 |

Figure 7:
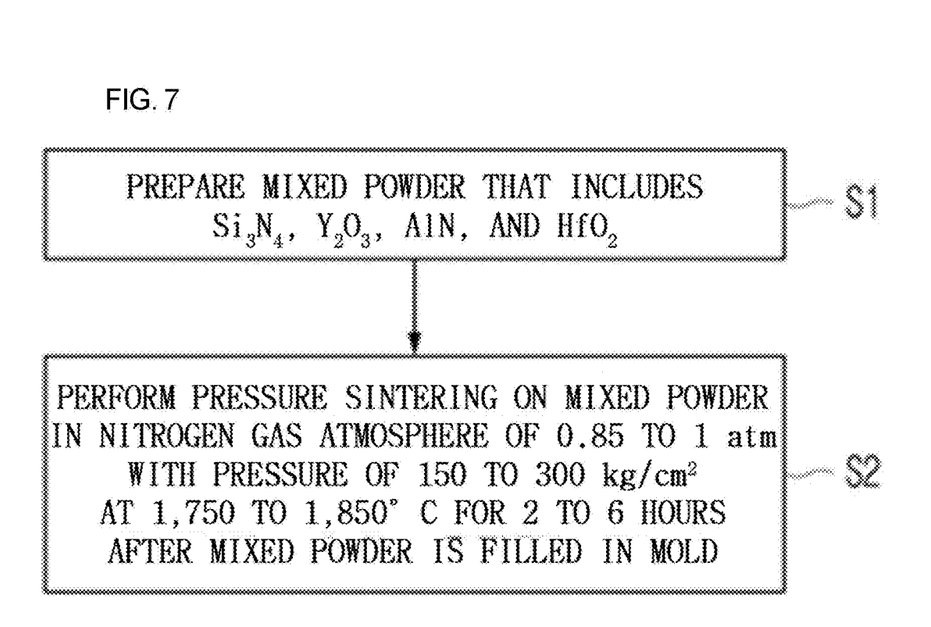
FIG. 7 is a flowchart illustrating a process procedure of a synthesis method of silicon nitride powder according to a third example of the present invention.

FIG. 7 is a flowchart illustrating a process procedure of a synthesis method of a silicon nitride sintered body according to third example of the invention.

With reference to FIG. 7, the synthesis method of a silicon nitride sintered body according to the third example of the invention includes step S1 of preparing mixed powder and step S2 of performing pressure sintering.

In the step of preparing mixed powder, particulate mixed powder is prepared by adding a sintering aid including 1 to 5 wt % of yttrium oxide ($Y_2O_3$), 0.5 to 1 wt % of aluminum nitride (AlN), and 0.5 to 1 wt % of hafnium oxide (HfO2) to 93 to 98 wt % of silicon nitride powder ($Si_3N_4$) synthesized in accordance with the first example of the invention, performing wet mixing in a ball mill with an ethanol solvent, and then drying an obtained mixture (S1).

In the step of performing pressure sintering, a silicon nitride sintered body is synthesized through pressure sintering by filling the mixed powder prepared in the step of preparing mixed powder into a mold made of graphite and then keeping the mixed powder at a temperature of 1,750 to 1,850° C. for 2 to 6 hours while pressure of 150 to 300 kg/cm$^2$ is applied thereto in a nitrogen gas atmosphere of 0.85 to 1 atm (S2).

Hereinafter, the silicon nitride sintered body was synthesized in accordance with the synthesis method according to the third example of the invention, and a silicon nitride sintered body was synthesized as a comparative example in the same method as the synthesis method according to the third example but using silicon nitride powder having a grade of E-10 which is sold from UBE Corporation in Japan.

EXAMPLE 4

Particulate mixed powder was prepared by adding a sintering aid including 5 wt % of yttrium oxide, 1 wt % of aluminum nitride, and 0.5 wt % of hafnium oxide to 93.5 wt % of silicon nitride powder synthesized in Example 1, performing wet mixing in a ball mill with an ethanol solvent, and then drying an obtained mixture.

A silicon nitride sintered body was synthesized through pressure sintering by filling the prepared mixed powder into a mold made of graphite and then keeping the mixed powder at a temperature of 1,780° C. for 4 hours while pressure of 300 kg/cm$^2$ is applied thereto in a nitrogen gas atmosphere of 1 atm.

COMPARATIVE EXAMPLE

Particulate mixed powder was prepared by adding a sintering aid including 5 wt % of yttrium oxide, 1 wt % of aluminum nitride, and 0.5 wt % of hafnium oxide to 93.5 wt % of silicon nitride powder having a grade of E-10 manufactured by UBE corporation in Japan, performing wet mixing in a ball mill with an ethanol solvent, and then drying an obtained mixture.

A silicon nitride sintered body was synthesized through pressure sintering by filling the prepared mixed powder into a mold made of graphite and then keeping the mixed powder at a temperature of 1,780° C. for 4 hours while pressure of 300 kg/cm$^2$ is applied thereto in a nitrogen gas atmosphere of 1 atm.

As described above, relative density of the synthesized silicon nitride sintered body of Example 4 and the silicon nitride sintered body of the comparative example was measured in accordance with Archimedes' principle, and the silicon nitride sintered bodies of Example 4 and the comparative example were processed to 3×4 (mm) to measure three-point flexural strength in accordance with JIS-R1601, and the fracture toughness was measured in accordance with JIS-R1607. Measured results are provided in Table 4 below.

TABLE 4

| Analysis items | Relative density (%) | Three-point flexural strength (MPa) Room temperature | Three-point flexural strength (MPa) 1,300° C. | Fracture toughness (MPam$^{1/2}$) |
|---|---|---|---|---|
| Example 4 | 99.9 | 1410 | 1190 | 9.14 |
| Comparative example | 97.5 | 1104 | 810 | 6.69 |

As shown in Table 4 provided above, the silicon nitride sintered body of Example 4 synthesized in accordance with the third example of the invention is observed to have higher relative density, three-point flexural strength at room temperature and a high temperature, and fracture toughness than those of the comparative example, and thus the silicon nitride sintered body of Example 4 synthesized in accordance with the third example of the invention is found to have high mechanical strength.

Figure 8:
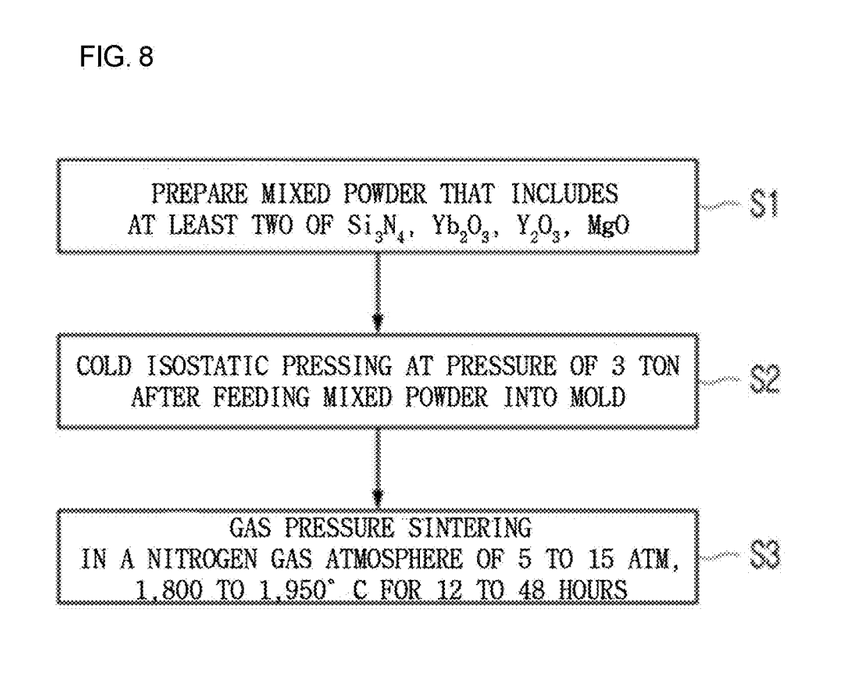
FIG. 8 illustrates a process flow of a method for manufacturing silicon nitride powder according to a fourth example of the present invention.

FIG. 8 is a flowchart illustrating a process procedure of a synthesis method of a silicon nitride sintered body according to a fourth example of the present invention.

With reference to FIG. 8, the synthesis method of a silicon nitride sintered body according to the fourth example of the invention includes step S1 of preparing mixed powder, step S2 of performing cold isostatic pressing, and step S3 of performing gas pressure sintering.

In the step of preparing mixed powder, particulate mixed powder is prepared by adding 2 to 9 mol % of a sintering aid including ytterbium oxide (Yb203), yttrium oxide ($Y_2O_3$), and magnesium oxide (MgO) to 91 to 98 mol % of silicon nitride powder (SiN4) synthesized in accordance with the first example of the invention, performing wet mixing in a ball mill with an ethanol solvent, and then drying an obtained mixture (S1).

In the step of performing cold isostatic pressing, the mixed powder prepared in the step of preparing mixed powder is put into a mold and then subjected to the cold isostatic pressing with pressure of 3 ton to manufacture a molded article (S2).

In the step of performing gas pressure sintering, a silicon nitride sintered body is manufactured by performing gas pressure sintering on the molded article manufactured in the step of performing cold isostatic pressing, in a nitrogen gas atmosphere of 5 to 15 atm at a temperature of 1,800 to 1,950° C. for 12 to 48 hours (S3).

Below, silicon nitride sintered body is synthesized in accordance with the synthesis method according to the fourth example of the invention.

EXAMPLE 5

Particulate mixed powder was prepared by adding 7 mol % of a sintering aid including 2 mol % of ytterbium oxide and 5 mol % of magnesium oxide to 93 mol % of silicon nitride powder synthesized in Example 2, performing wet mixing in a ball mill with an ethanol solvent, and then drying an obtained mixture.

The prepared mixed powder was put into a mold and then subjected to the cold isostatic pressing at pressure of 3 ton to manufacture a molded article.

A silicon nitride sintered body was synthesized by performing gas pressure sintering on the manufactured molded article in a nitrogen gas atmosphere of 9 atm at a temperature of 1,850° C. for 12 hours.

EXAMPLE 6

The synthesis method is the same as Example 5 except that the gas pressure sintering time is increased to 24 hours when compared to Example 5.

EXAMPLE 7

The synthesis method is the same as Example 5 except that the gas pressure sintering time is increased to 48 hours when compared to Example 5.

EXAMPLE 8

The synthesis method is the same as Example 5 except that, instead of 2 mol % of ytterbium oxide, 2 mol % of yttrium oxide is used as the sintering aid when compared to Example 5.

EXAMPLE 9

The synthesis method is the same as Example 5 except that, instead of 2 mol % of ytterbium oxide, 2 mol % of yttrium oxide is used as the sintering aid and the gas pressure sintering time is increased to 24 hours when compared to Example 5.

EXAMPLE 10

The synthesis method is the same as Example 5 except that, instead of 2 mol % of ytterbium oxide, 2 mol % of yttrium oxide is used as the sintering aid and the gas pressure sintering time is increased to 48 hours when compared to Example 5.

The thermal conductivity of Examples 5 to 10 synthesized as described above was measured, and measured values are provided in Table 5 below.

TABLE 5

| Items | Sintering aids | Sintering conditions | Thermal conductivity (W/mk) |
|---|---|---|---|
| Example 5 | $Yb_2O_3$ 2 mol % + MgO 2 mol % | 9 atm, 1850° C., 12 hr | 89 |
| Example 6 | $Yb_2O_3$ 2 mol % + MgO 2 mol % | 9 atm, 1850° C., 24 hr | 96 |
| Example 7 | $Yb_2O_3$ 2 mol % + MgO 2 mol % | 9 atm, 1850° C., 48 hr | 102 |
| Example 8 | $Y_2O_3$ 2 mol % + MgO 2 mol % | 9 atm, 1850° C., 12 hr | 81 |
| Example 9 | $Y_2O_3$ 2 mol % + MgO 2 mol % | 9 atm, 1850° C., 24 hr | 89 |
| Example 10 | $Y_2O_3$ 2 mol % + MgO 2 mol % | 9 atm, 1850° C., 48 hr | 94 |

As shown in Table 5 above, the silicon nitride sintered bodies of Examples 5 to 10 synthesized in accordance with the fourth example of the invention is observed to have high thermal conductivity of 80 or higher, and thus the silicon nitride sintered body synthesized in accordance with the fourth example of the invention is also found to have high thermal conductivity.

According to the present invention as described above, it can provide the synthesis method of the silicon nitride powder that is synthesized to be fine particles, have the uniform particle size with an aspect ratio close to 1, and satisfy both an amount of surface oxygen and an amount of internal oxygen which are suitable for sintering and the silicon nitride sintered body, which can be applied to a silicon nitride circuit board, synthesized using the synthesized silicon nitride powder to have high thermal conductivity and mechanical strength at a high temperature.

While the present invention has been described with respect to the specific embodiments, it will be apparent to those skilled in the art that various changes and modifications may be made without departing from the spirit and scope of the invention as defined in the following claims.

What is claimed is:

1. A synthesis method of silicon nitride powder, comprising:
    preparing mixed powder having a particle size of 8 to 10 μm which includes 69 to 98 wt % of silicon powder, 1 to 30 wt % of α-phase silicon nitride powder, and 1 to 10 wt % of silicon dioxide powder;
    performing heat treatment on the mixed powder in a synthesis electric furnace under a nitrogen gas atmosphere of 0.85 to 1 atm at a temperature of 1,450 to 1,750° C. for 5 to 20 hours; and
    cooling the mixed powder gradually to obtain silicon nitride powder, wherein, before the performing of heat treatment, first mixed gas obtained by mixing nitrogen gas and hydrogen gas is fed into the synthesis electric furnace at a temperature of 600° C., and second mixed gas obtained by mixing moisture, nitrogen gas, hydrogen gas, and hydrogen fluoride gas is fed into the synthesis electric furnace at a temperature of 1,000° C., and wherein, after the performing of heat treatment, feeding of the first mixed gas and the second mixed gas is stopped.

2. The synthesis method of silicon nitride powder according to claim 1, wherein the silicon nitride powder includes 90 wt % or more of α-phase silicon nitride powder with respect to total weight.

3. A synthesis method of a silicon nitride sintered body using the silicon nitride powder synthesized by the synthesis method according to claim 2, the synthesis method of a silicon nitride sintered body comprising:

preparing mixed powder obtained by adding a sintering aid that includes 1 to 5 wt % of yttrium oxide, 0.5 to 1 wt % of aluminum nitride, and 0.5 to 1 wt % of hafnium oxide to 93 to 98 wt % of the silicon nitride powder; and performing pressure sintering on a silicon nitride sintered body by filling the mixed powder into a mold and then keeping the mixed powder at a temperature of 1,750 to 1,850° C. for 2 to 6 hours while pressure of 150 to 300 kg/cm$^2$ is applied thereto in a nitrogen gas atmosphere of 0.85 to 1 atm.

4. A synthesis method of a silicon nitride sintered body using the silicon nitride powder synthesized by the synthesis method according to claim 2, the synthesis method of a silicon nitride sintered body comprising:

preparing mixed powder obtained by adding 2 to 9 mol % of a sintering aid that includes at least two oxides of ytterbium oxide, yttrium oxide, and magnesium oxide to 91 to 98 mol % of the silicon nitride powder;

performing cold isostatic pressing to manufacture a molded article at pressure of 3 ton after the mixed powder is fed into a mold; and performing gas pressure sintering the molded article in a nitrogen gas atmosphere of 5 to 15 atm at a temperature of 1,800 to 1,950° C. for 12 to 48 hours and synthesizing a silicon nitride sintered body.

5. The synthesis method of silicon nitride powder according to claim 1, wherein the first mixed gas includes 50 to 90 vol % of nitrogen gas and 10 to 50 vol % of hydrogen gas, and wherein the second mixed gas includes 50 to 90 vol % of nitrogen gas and 10 to 50 vol % of hydrogen gas, in which an amount of moisture is contained by 0.5 to 0.6% with respect to a supply amount of the second mixed gas and a supply amount of hydrogen fluoride gas is 0.001 to 0.5% with respect to a supply amount of the nitrogen gas.

6. A synthesis method of a silicon nitride sintered body using the silicon nitride powder synthesized by the synthesis method according to claim 5, the synthesis method of a silicon nitride sintered body comprising:

preparing mixed powder obtained by adding a sintering aid that includes 1 to 5 wt % of yttrium oxide, 0.5 to 1 wt % of aluminum nitride, and 0.5 to 1 wt % of hafnium oxide to 93 to 98 wt % of the silicon nitride powder; and performing pressure sintering on a silicon nitride sintered body by filling the mixed powder into a mold and then keeping the mixed powder at a temperature of 1,750 to 1,850° C. for 2 to 6 hours while pressure of 150 to 300 kg/cm$^2$ is applied thereto in a nitrogen gas atmosphere of 0.85 to 1 atm.

7. A synthesis method of a silicon nitride sintered body using the silicon nitride powder synthesized by the synthesis method according to claim 5, the synthesis method of a silicon nitride sintered body comprising:

preparing mixed powder obtained by adding 2 to 9 mol % of a sintering aid that includes at least two oxides of ytterbium oxide, yttrium oxide, and magnesium oxide to 91 to 98 mol % of the silicon nitride powder;

performing cold isostatic pressing to manufacture a molded article at pressure of 3 ton after the mixed powder is fed into a mold; and performing gas pressure sintering the molded article in a nitrogen gas atmosphere of 5 to 15 atm at a temperature of 1,800 to 1,950° C. for 12 to 48 hours and synthesizing a silicon nitride sintered body.

8. A synthesis method of a silicon nitride sintered body using the silicon nitride powder synthesized by the synthesis method according to claim 1, the synthesis method of a silicon nitride sintered body comprising:

preparing mixed powder obtained by adding a sintering aid that includes 1 to 5 wt % of yttrium oxide, 0.5 to 1 wt % of aluminum nitride, and 0.5 to 1 wt % of hafnium oxide to 93 to 98 wt % of the silicon nitride powder; and performing pressure sintering on a silicon nitride sintered body by filling the mixed powder into a mold and then keeping the mixed powder at a temperature of 1,750 to 1,850° C. for 2 to 6 hours while pressure of 150 to 300 kg/cm$^2$ is applied thereto in a nitrogen gas atmosphere of 0.85 to 1 atm.

9. A synthesis method of a silicon nitride sintered body using the silicon nitride powder synthesized by the synthesis method according to claim 1, the synthesis method of a silicon nitride sintered body comprising:

preparing mixed powder obtained by adding 2 to 9 mol % of a sintering aid that includes at least two oxides of ytterbium oxide, yttrium oxide, and magnesium oxide to 91 to 98 mol % of the silicon nitride powder;

performing cold isostatic pressing to manufacture a molded article at pressure of 3 ton after the mixed powder is fed into a mold; and performing gas pressure sintering the molded article in a nitrogen gas atmosphere of 5 to 15 atm at a temperature of 1,800 to 1,950° C. for 12 to 48 hours and synthesizing a silicon nitride sintered body.

10. A synthesis method of silicon nitride powder, comprising:

preparing mixed powder having a particle size of 8 to 10 μm which includes 69 to 98 wt % of silicon powder, 1 to 30 wt % of α-phase silicon nitride powder, and 1 to 10 wt % of silicon dioxide powder;

performing heat treatment on the mixed powder in a synthesis electric furnace under a nitrogen gas atmosphere of 0.85 to 1 atm at a temperature of 1,800 to 1,900° C. for 5 to 20 hours; and cooling the heat-treated mixed powder at −100° C./hr to obtain silicon nitride powder, wherein, before the performing of heat treatment, first mixed gas obtained by mixing nitrogen gas and hydrogen gas is fed into the synthesis electric furnace at a temperature of 600° C., and second mixed gas obtained by mixing moisture, nitrogen gas, hydrogen gas, and hydrogen fluoride gas is fed into the synthesis electric furnace at a temperature of 1,000° C., and wherein, after the performing of heat treatment, feeding of the first mixed gas and the second mixed gas is stopped.

11. The synthesis method of silicon nitride powder according to claim 10,
wherein the silicon nitride powder includes 90 wt % or more of β-phase silicon nitride powder.

12. The synthesis method of silicon nitride powder according to claim 10,
wherein the first mixed gas includes 50 to 90 vol % of nitrogen gas and 10 to 50 vol % of hydrogen gas, and
wherein the second mixed gas includes 50 to 90 vol % of nitrogen gas and 10 to 50 vol % of hydrogen gas, in which an amount of moisture is contained by 0.5 to 0.6% with respect to a supply amount of the second mixed gas and a supply amount of hydrogen fluoride gas is 0.001 to 0.5% with respect to a supply amount of the nitrogen gas.

* * * * *